(12) United States Patent
Masoudipour et al.

(10) Patent No.: US 7,591,147 B2
(45) Date of Patent: Sep. 22, 2009

(54) ELECTRIC MOTOR COOLING JACKET RESISTOR

(75) Inventors: Mike M. Masoudipour, Torrance, CA (US); Allen Hansen, Anaheim, CA (US)

(73) Assignee: Honeywell International Inc., Morristown, NJ (US)

( * ) Notice: Subject to any disclaimer, the term of this patent is extended or adjusted under 35 U.S.C. 154(b) by 273 days.

(21) Appl. No.: 11/555,645

(22) Filed: Nov. 1, 2006

(65) Prior Publication Data

US 2008/0098768 A1  May 1, 2008

(51) Int. Cl.
*H02K 5/20* (2006.01)
*H02K 9/18* (2006.01)
*H02K 9/16* (2006.01)

(52) U.S. Cl. .............................. 62/505; 310/58; 310/54; 310/60 A; 165/169

(58) Field of Classification Search ...................... 62/92, 62/123, 149, 285, 291, 503, 505, 509; 310/54, 310/58
See application file for complete search history.

(56) References Cited

U.S. PATENT DOCUMENTS

| | | | |
|---|---|---|---|
| 3,075,103 A * | 1/1963 | Ward, Jr. ..................... 310/54 |
| 3,218,825 A | 11/1965 | McClure et al. |
| 4,903,497 A | 2/1990 | Zimmern et al. |
| 5,983,644 A * | 11/1999 | Bolandi et al. ................. 62/3.2 |
| 6,051,891 A * | 4/2000 | Surodin ......................... 290/2 |
| 6,065,297 A | 5/2000 | Tischer et al. |
| 6,997,686 B2 | 2/2006 | Agrawal et al. |
| 7,063,519 B2 * | 6/2006 | Agrawal et al. .......... 417/423.1 |
| 2005/0235672 A1 * | 10/2005 | Hsu et al. .................. 62/259.2 |

FOREIGN PATENT DOCUMENTS

WO       WO8703748       6/1987

\* cited by examiner

*Primary Examiner*—Frantz F Jules
*Assistant Examiner*—Cassey Bauer
(74) *Attorney, Agent, or Firm*—Oral Caglar, Esq.

(57) ABSTRACT

A cooling jacket resistor includes a passageway incorporated into a wall and across the entire inside length of a cooling jacket from an inside of the cooling jacket. The passageway may include at least one sump and may have a depth that inclines from a first to a second end. The cooling jacket resistor may be positioned at the lowest point of the cooling jacket when installed in an electrical motor/generator. The cooling jacket resistor may collect condensed refrigerant in liquid form and may transport the condensed refrigerant towards a drain port by gravity. The condensed refrigerant may then be drained from the cooling jacket resistor through the drain port. The cooling jacket resistor may be suitable for, but not limited to, applications in electric motors or generators that uses vapor as a coolant, for example, two-stage refrigerant cooled vapor cycle compressors.

19 Claims, 5 Drawing Sheets

ELECTRIC MOTOR COOLING JACKET RESISTOR

BACKGROUND OF THE INVENTION

The present invention generally relates to electric motors/generators and electrically driven compressors and, more particularly, to a cooling jacket resistor of a refrigerant-vapor cooled electric motor/generator and a method for draining condensed refrigerant from a cooling jacket.

An electric motor converts electrical energy into kinetic energy, whereas the reverse task, that of converting kinetic energy into electrical energy, is accomplished by a generator. A typical electric motor consists of an outside stationary stator producing a rotating magnetic field and an inside rotor attached to the output shaft that is given a torque by the rotating field. Generally, a considerable amount of heat is generated during the operation of the electric motor and it may be desirable to cool the space between the rotor shaft and the stator as well as the motor stator, especially when the motor is operated at high speeds.

In the past, various cooling structures for cooling an electric motor have been developed, such as providing passages for a coolant at the circumference of a motor or a cooling jacket for circulating a coolant fluid in grooves around the stator. It is also known in the art, that the motor of an electrically driven compressor may be cooled by liquid refrigerant, by refrigerant vapor, or a combination thereof.

U.S. Pat. No. 4,903,497, for example, teaches grooves between a stator and a motor housing for circulation of a liquid refrigerant that is in an at least partly vapor state, and which cools the stator without any short-circuit in the stator coils.

U.S. Pat. No. 3,218,825, for example, teaches conducting liquid refrigerant through passageways of the motor stator to cool the stator by evaporation of the refrigerant and conducting the vaporized refrigerant to a condenser or an evaporator.

Furthermore, U.S. Pat. No. 6,997,686 teaches a cooling jacket mounted around a stator of an electric motor, which drives a two-stage compressor. A liquid refrigerant passes through corkscrew-shaped grooves on the circumference of the cooling jacket from an inlet to an outlet, thereby cooling the motor stator. Additionally, refrigerant gas may pass through a gap between the motor rotor and stator. The gas may serve to remove heat from the motor rotor and bearings. The gas may be propelled through the compressor by the pressure differential between the first and second stages. The gas may flow from the second impeller through several bearings and spaces between the motor rotor and the stator and may empty out into the discharged gas from the first impeller.

While circulating a refrigerant gas through gaps between the motor rotor and stator may supplement the cooling of the rotor with a liquid refrigerant, problems may arise when the operation of the motor is stopped. Refrigerant gas trapped within the gaps between the rotor and the stator may condense and, consequently, become liquefied. This condensed liquid may be trapped inside a cooling jacket and may become a problem if accumulated. Prior art outlets for the refrigerant gas used for cooling the rotor/stator may not be suitable for draining the condensed refrigerant. Liquid trapped inside the cooling jacket may cause damage on part of the motor, such as bearings and electrical connections. If a refrigerant gas, especially a refrigerant with a relatively high conductivity, is used inside a cooling jacket, it may require special insulation of electric wires of the motor.

As can be seen, there is a need for a mechanism that allows draining the condensed refrigerant from a cooling jacket of an electric motor where the internal space of a cooling jacket is cooled with a refrigerant gas. Furthermore, there is a need for a method of draining condensed liquid refrigerant from the internal space of a cooling jacket that does not impair the primary stator/rotor cooling scheme.

SUMMARY OF THE INVENTION

In one aspect of the present invention, a cooling jacket resistor comprises a passageway extending from a first end to a second end. The passageway has a depth that inclines from the first end to the second end, receives and transports a liquid, and resists the entrance of a vapor. The passageway is positioned inside the cooling jacket.

In another aspect of the present invention, a cooling jacket of an electric motor comprises a tube extending longitudinally along an axis, a plurality of grooves incorporated along the circumference of the tube into the wall from the outside, and a cooling jacket resistor incorporated into the wall from the inside. The tube includes a wall and has an outside, an inside, and an inside length. The cooling jacket resistor includes a passageway that extends in the direction of the axis from a first end to a second end entirely over the inside length of the tube. The passageway has a depth that inclines from the first end to the second end, the depth being smallest at the first end and being largest at the second end. The cooling jacket resistor is positioned at the lowest point of the tube when the tube is installed in the electrical motor.

In a further aspect of the present invention, a method for draining condensed refrigerant from a cooling jacket comprises the steps of: collecting condensed refrigerant in a cooling jacket resistor integrated into the inside of a cooling jacket of a refrigerant-vapor cooled rotor/stator assembly; transporting the condensed refrigerant within the cooling jacket resistor towards a drain port by gravity; and draining the condensed refrigerant from the cooling jacket through the drain port.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides an electric motor cooling jacket resistor of a refrigerant-vapor cooled electric motor/generator and a method for draining condensed refrigerant from a cooling jacket. In one embodiment the present invention provides a cooling jacket resistor incorporated into the wall of an electric motor cooling jacket that enables draining of the condensed refrigerant trapped inside the cooling jacket after the operation of the electric motor was stopped. An embodiment of the present invention provides an electric motor cooling jacket that does not interfere with the refrigerant vapor flow and the cooling mechanism inside the cooling jacket. An embodiment of the present invention provides a cooling jacket resistor that is suitable, but not limited to, applications in electrically driven refrigeration compressors that use a refrigerant vapor for stator/rotor cooling, such as two-stage refrigerant cooled vapor cycle compressors. An embodiment of the present invention provides a cooling jacket resistor that is suitable, but not limited to, applications in air-conditioning systems, for example in the aircraft and aerospace industries. Furthermore, the cooling jacket as in an embodiment of the present invention may be used in connection with any electric motor or generator that uses vapor as a refrigerant.

In contrast with the prior art, where outlets for the refrigerant gas used for cooling the rotor/stator are not suitable for draining condensed refrigerant liquid, the cooling jacket resistor incorporated into the wall of an electric motor cooling jacket as in one embodiment enables draining of condensed refrigerant through the same drain port as the refrigerant vapor.

In further contrast to the prior art where special insulation of electric wires of the motor may be needed to avoid damage from condensed refrigerant, the present invention provides a cooling jacket resistor that collects all condensed refrigerant and transports the liquid to the drain port of the refrigerant gas for draining from the cooling jacket. The cooling jacket resistor as in one embodiment of the present invention may be incorporated into the wall of the cooling jacket and may resist the entrance of the refrigerant vapor to discourage leakage of the refrigerant vapor used for cooling the electric motor/rotor assembly.

Figure 1:
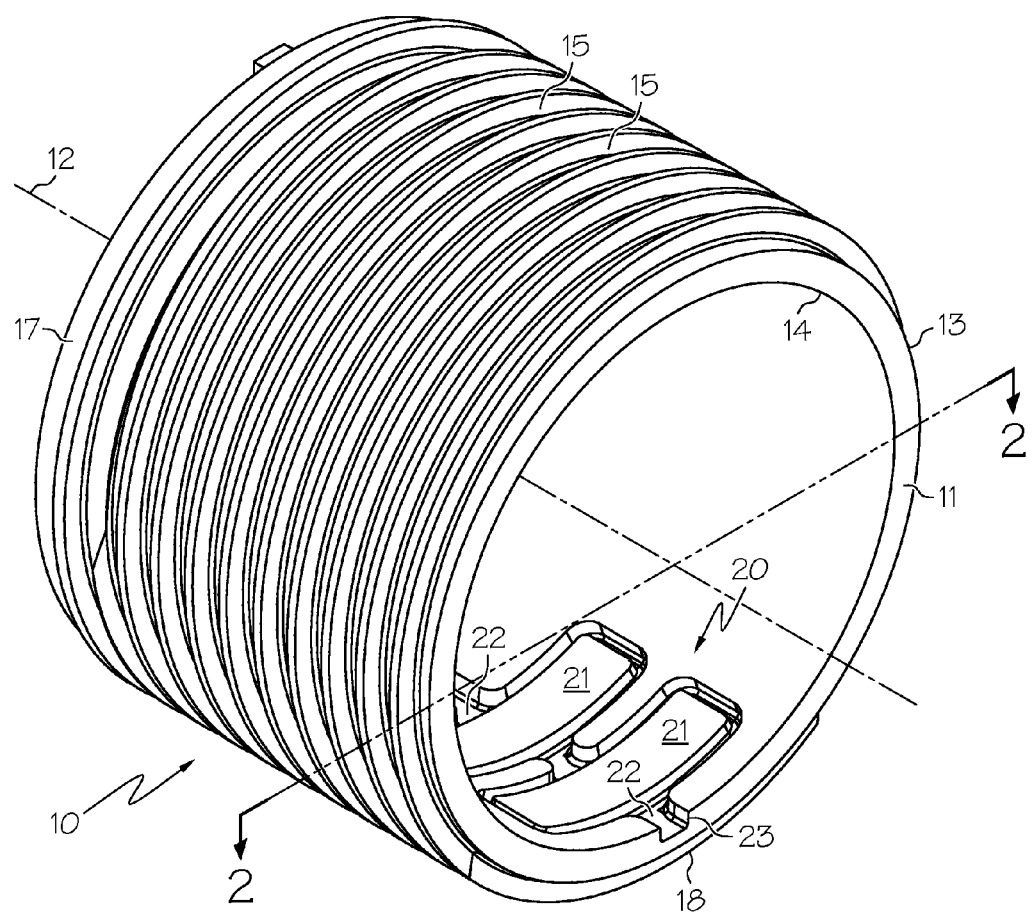
FIG. 1 is a perspective view of an electric motor cooling jacket according to an embodiment of the present invention.
Figure 4:
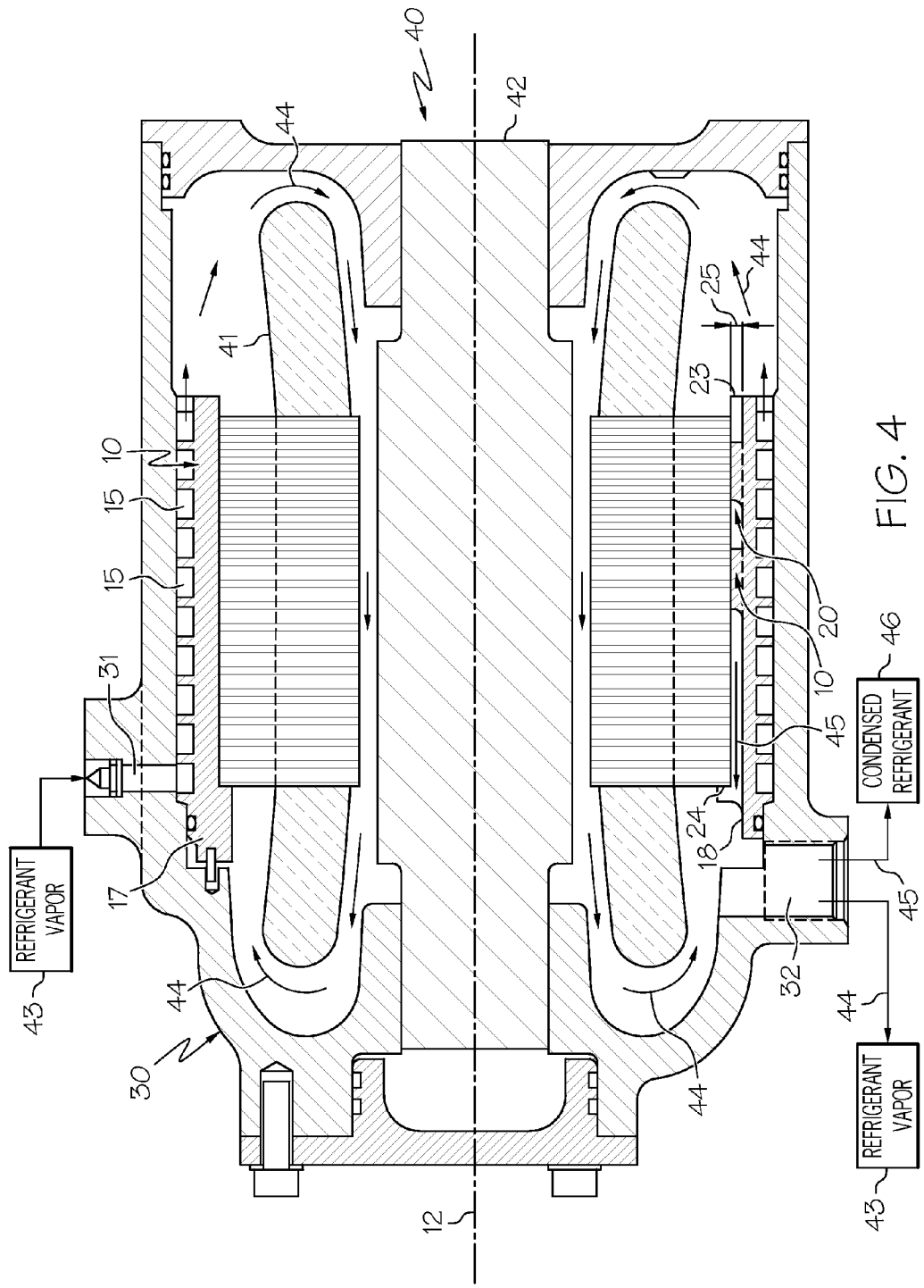
FIG. 4 is a cross-sectional side view of a rotor/stator assembly of an electric motor according to an embodiment of the present invention.

Referring now to FIG. 1, a perspective view of an electric motor cooling jacket 10 is illustrated according to an embodiment of the present invention. The cooling jacket 10 may be a tube 17 having a wall 11 and may extend longitudinally along an axis 12. The cooling jacket 10 may have an outside 13, an inside 14, and an inside length 16 (shown in FIG. 2). The cooling jacket 10 may include a plurality of grooves 15 incorporated along the circumference into the wall 11 from the outside 13. The cooling jacket 10 may further include a cooling jacket resistor 20 incorporated into the wall 11 from the inside 14. The cooling jacket resistor 20 may also extend longitudinally in the direction of the axis 12. The cooling jacket resistor 20 may be positioned at the lowest point 18 of the tube 17 when the cooling jacket 10 is installed. The cooling jacket 10 may be installed to surround a rotor/stator assembly 40 (illustrated in FIG. 4) of an electric motor or generator and may be in physical contact with a stator 41 (FIG. 4). Refrigerant vapor 43 (FIG. 4) may be run in the grooves 15 over the outside 13 of the cooling jacket 10, thereby removing heat from the stator 41 as the coolant passes through the grooves 15. The cooling jacket 10 may be manufactured out of a variety of materials including aluminum and nickel, and alloys thereof, as well as steel. The cooling jacket 10 including the cooling jacket resistor 20 may be manufactured as a cast from a casting alloy during a casting process. Alternatively, the cooling jacket resistor 20 may be machined into the wall 11 of the cooling jacket 10.

Figure 2:
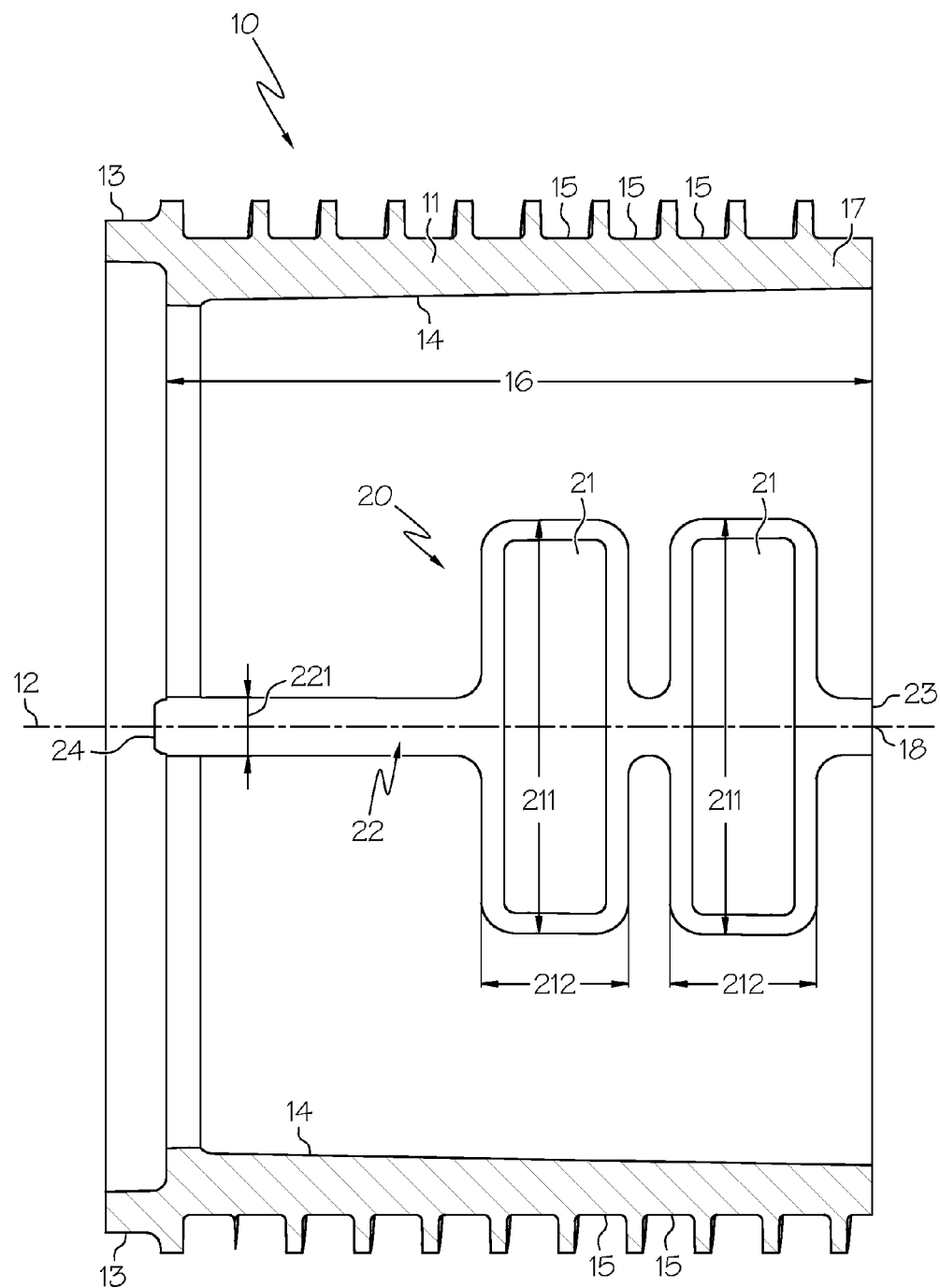
FIG. 2 is a cross-sectional top view along line 2-2 of the electric motor cooling jacket of FIG. 1 according to an embodiment of the present invention.

Referring now to FIG. 2, a cross-sectional top view along line 2-2 of the electric motor cooling jacket 10 (shown in FIG. 1) is illustrated according to an embodiment of the present invention. FIG. 2 shows the inside 14 of a lower half of the tube 17 of the cooling jacket 10 enabling a better view of the cooling jacket resistor 20 incorporated into the wall 11 from the inside 14. The cooling jacket resistor 20 may be a passageway 22 that extends in the direction of the axis 12 from a first end 23 to a second end 24 for the entire inside length 16 of the tube 17.

Figure 3:
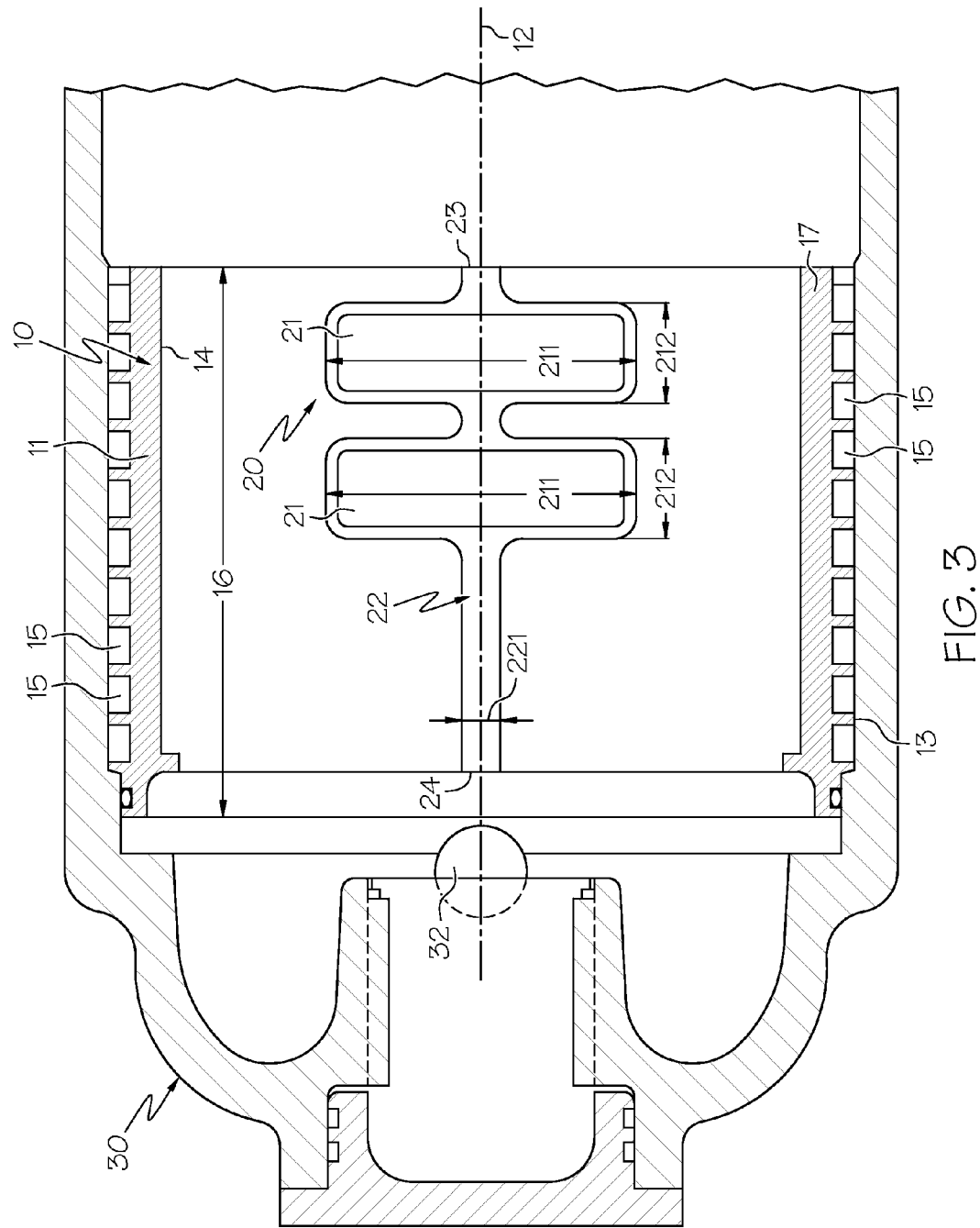
FIG. 3 is a cross-sectional top view of an electric motor cooling jacket installed in a housing according to an embodiment of the present invention.

The passageway 22 having a width 221 may include two sumps 21 each having a width 211 and a length 212. The sumps 21 may be positioned between the first end 23 and the second end 24. For example, the sumps 21 may be positioned in close proximity to the first end as shown in FIGS. 2 and 3. The sumps 21 may extend in the direction of the axis 12. The width 211 of the sump 21 may be larger than the width 221 of the passageway 22. Each of the sumps 21 may have the same width 211, as illustrated, or each sump 21 may have a different width 211. The width 211 of the sumps 21 and the width 221 of the passageway 22 may be determined based on the amount of condensed refrigerant to be collected. The number of sumps 21 included in the cooling jacket resistor 20 may be determined based on the amount of condensed refrigerant to be collected. For example, the sumps 21 may be positioned in close proximity to the first end as shown in FIGS. 2 and 3. The position of the sumps may be based on the area where the greatest amount of condensed refrigerant is expected. The cooling jacket resistor 20 may include only one sump 21 or more than the two sumps 22 illustrated in FIGS. 1-3.

The cooling jacket resistor 20 may have a depth 25 (shown in FIG. 4) that inclines from the first end 23 to the second end 24, the depth 25 being smallest at the first end 23, and the depth 25 being the largest at the second end 24. By inclining, the cooling jacket resistor 20 may enable the collected liquid, the condensed refrigerant 46 (FIG. 4), to travel within the passageway 22 from the first end 23 towards the second end 24 driven by gravity.

Referring now to FIG. 3, a cross-sectional top view of an electric motor cooling jacket 10 installed in a housing 30 is illustrated according to an embodiment of the present invention. The housing 30 may include an inlet port 31 (shown in FIG. 4) and a drain port 32. The inlet port 31 may receive the refrigerant vapor 43 (shown in FIG. 4). The drain port 32 may be typically used as a refrigerant vapor outlet. As can be seen, the second end 24 of the cooling jacket resistor 20 may be in fluid connection with the drain port 32 (also shown in FIG. 4), such that the collected condensed refrigerant 46 in liquid form may be drained from the cooling jacket resistor 20 and, therefore, from the inside 14 of the cooling jacket 10 through the drain port 32.

Referring now to FIG. 4, a cross-sectional side view of a rotor/stator assembly 40 of an electric motor is illustrated according to an embodiment of the present invention. The rotor/stator assembly 40 may include a stator 41 and a rotor 42. The rotor/stator assembly 40 may be installed in a housing 30. The cooling jacket 10 may be installed around the rotor/stator assembly 40 and may be in physical contact with the stator 41 and the housing 30. The housing 30 may include an inlet port 31 and a drain port 32. The inlet port 31 may receive the refrigerant vapor 43. The arrows 44 may indicate the path of the refrigerant vapor 43 (vapor path) flowing through the rotor/stator assembly 40. As can be seen, the refrigerant vapor 43 may flow inside the housing 30 and inside the cooling jacket 10 picking up the heat generated during the rotation of the rotor 42 inside the stator 41. The vapor path as indicated by arrows 44 may follow a pressure drop inside the housing 30 from the inlet port 31 to the drain port 32. The refrigerant vapor 43 may exit the rotor/stator assembly 40 at the drain port 32. Once the operation of the electric motor and, therefore, of the rotor/stator assembly 40 may be stopped, refrigerant vapor 43 may be trapped inside the housing 30 and, consequently, inside the cooling jacket 10 as well as in between the rotor 42 and the stator 41. The trapped refrigerant vapor 43 may condense and take on liquid state. The condensed refrigerant 46 may accumulate over time inside the housing 31 and inside the cooling jacket 10 and may cause problems, for example, for the electrical system and the bearings of the rotor/stator assembly 40. Drainage of the condensed refrigerant 46 may prevent or mitigate accumulation of the liquid.

To enable draining of the condensed refrigerant 46, the cooling jacket 10 may include the cooling jacket resistor 20, as shown in FIGS. 1-3 and as described above. The cooling jacket resistor 20 may collect the condensed refrigerant 46 that has taken on liquid state and guide the collected liquid towards the drain port 32. The cooling jacket resistor 20 may transport the collected condensed refrigerant 46 towards the drain port 32 by gravity. The condensed refrigerant 46 collected by the cooling jacket resistor 20 may then be drained from the cooling jacket resistor 20 and, therefore, from the cooling jacket 10, through the drain port 32. The direction of flow of the condensed refrigerant 46 collected by the cooling jacket resistor 20 is indicated in FIG. 4 by arrow 45. As can be seen the direction of flow of the condensed refrigerant 46 (arrow 45) may be opposite from the direction of flow of the refrigerant vapor 43 (arrows 44). Since vapor typically may move in the path of the least resistance and along a pressure drop, the cooling jacket resistor 20 may be constructed such that the refrigerant vapor 43 may not enter the passageway 22. If the refrigerant vapor 43 would enter the cooling jacket resistor 20, it would be lost for the purpose of cooling the rotor/stator assembly 40. By draining the refrigerant vapor 43 and the condensed refrigerant 46 through the same outlet, the drain port 32, only one outlet may be needed to be included in the housing 31.

Figure 5:
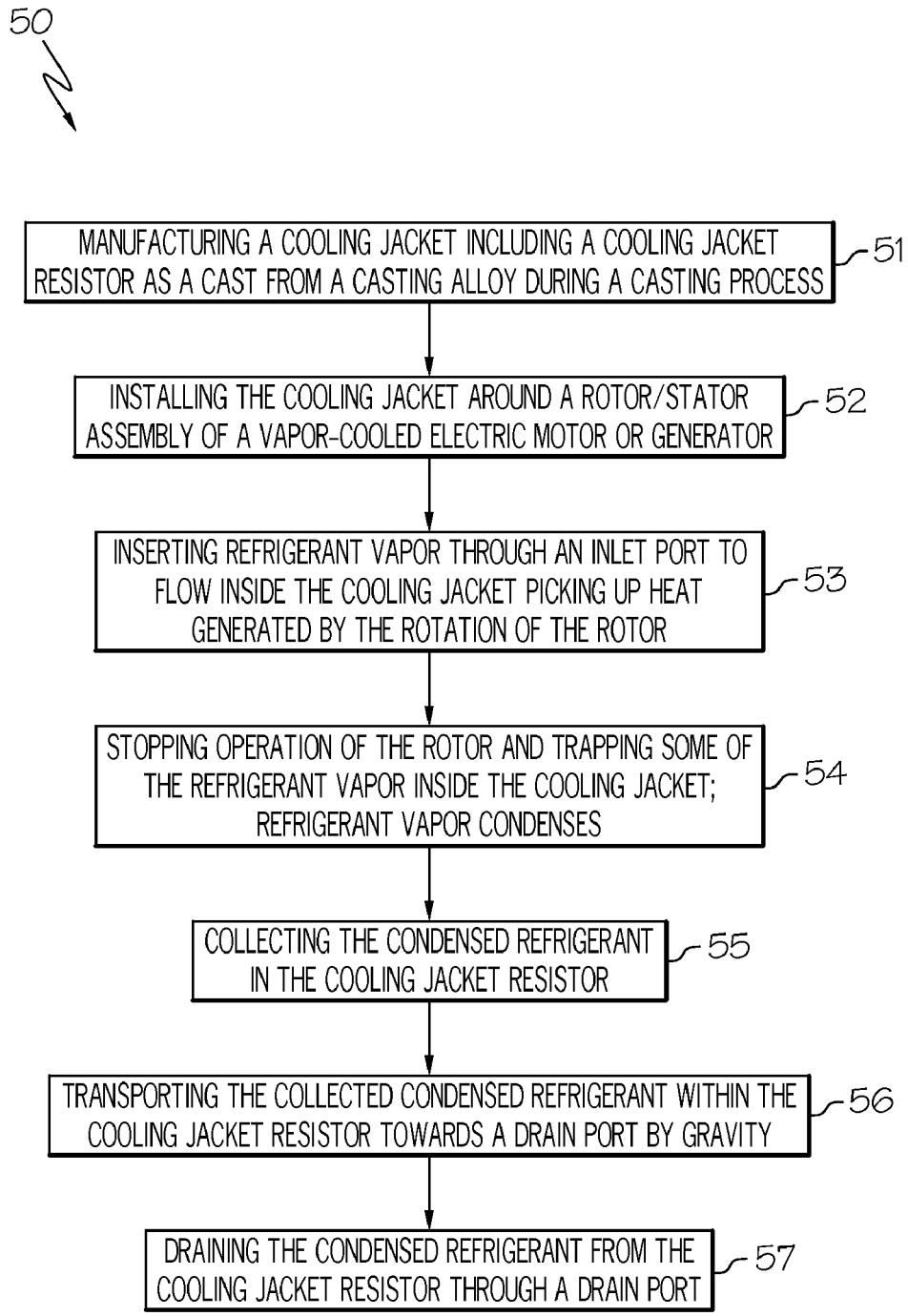
FIG. 5 is a flow chart schematically representing a method for draining condensed refrigerant from an electric motor cooling jacket according to an embodiment of the present invention.

Referring now to FIG. 5, a flow chart schematically representing a method 50 for draining condensed refrigerant 46 from an electric motor cooling jacket 10 is illustrated according to an embodiment of the present invention. The method 50 may involve a step 51 where a cooling jacket 10 including a cooling jacket resistor 20 is manufactured as a cast from a casting alloy during a casting process.

A step 52 may involve installing the cooling jacket 10 in a vapor cooled electric motor or generator such that the cooling jacket 10 surrounds a rotor/stator assembly 40. A following step 53 may involve inserting a refrigerant vapor 43 into a housing 30 through an inlet port 31 such that the refrigerant vapor 43 may flow inside the housing 30 and inside the cooling jacket 10 along a path of pressure drop picking up the heat generated during the rotation of the rotor 42 inside the stator. A step 54 may involve stopping the operation of the rotor 42 and trapping a portion of the refrigerant vapor 43 inside the housing 30 and inside the cooling jacket 10 where the trapped refrigerant vapor 43 may condense and take on a liquid state forming the condensed refrigerant 46.

In a step 55, the condensed refrigerant 46 may be collected in the cooling jacket resistor 20. The collected condensed refrigerant 46 may be transported within the cooling jacket resistor 20 towards the drain port 32 by gravity in a step 56. And in a final step 57, the condensed refrigerant 46 may be drained from the cooling jacket resistor 20 through the drain port 32, which may be also used as an outlet port for the refrigerant vapor 43.

It should be understood, of course, that the foregoing relates to exemplary embodiments of the invention and that modifications may be made without departing from the spirit and scope of the invention as set forth in the following claims.

We claim:

1. A cooling jacket, comprising:
   a tube extending longitudinally along an axis, wherein said tube includes a wall and has an outside, an inside, and an inside length;
   a plurality of grooves incorporated along the circumference of said tube into said wall on said outside of said tube; and
   inside said tube a cooling jacket resistor, the cooling jacket resistor comprising:
      a passageway extending from a first end of the cooling jacket to a second end of said cooling jacket;
      wherein said passageway has a variable depth that inclines from said first end to said second end, such that refrigerant liquid present at said first end is gravitationally moved to said second end during operation or at rest of said cooling jacket resistor;
      wherein said passageway receives and transports a refrigerant liquid, and wherein said passageway resists the entrance of a refrigerant vapor;
      wherein said passageway is positioned inside said cooling jacket and extends for a first length in the direction of an axis, and wherein said depth is smallest at said first end and largest at said second end; and
   wherein said cooling jacket includes a drain port, said drain port enables draining of both condensed refrigerant and refrigerant vapor.

2. The cooling jacket resistor of claim 1, wherein said passageway has a first width and includes a sump having a second width that is larger than said first width, wherein said sump extends in the direction of said axis for a second length that is smaller than said first length, and wherein said sump is positioned between said first end and said second end.

3. The cooling jacket resistor of claim 2, wherein said passageway further includes an additional sump having a third width that is larger than said first width, wherein said additional sump extends in the direction of said axis, and wherein said additional sump is positioned between said first end and said second end.

4. The cooling jacket resistor of claim 1, wherein a refrigerant vapor flows through said cooling jacket, wherein said refrigerant vapor condenses inside said cooling jacket forming condensed refrigerant, and wherein said passageway collects said condensed refrigerant.

5. The cooling jacket resistor of claim 4, wherein said passageway transports said condensed refrigerant towards the second end by gravity.

6. The cooling jacket resistor of claim 1, wherein said passageway resists the entrance of said refrigerant vapor flowing through said cooling jacket due to an increased vapor pressure drop.

7. The cooling jacket resistor of claim 4, wherein said second end of said passageway is in fluid connection with the drain port used for draining said refrigerant vapor and said condensed refrigerant.

8. The cooling jacket resistor of claim 1, wherein said cooling jacket surrounds a rotor/stator assembly of an electric motor or generator that is refrigerant vapor cooled.

9. The cooling jacket resistor of claim 1, wherein said cooling jacket has an inside length, and wherein said passageway extends entirely over said inside length.

10. A cooling jacket of an electrical motor, comprising:
a tube extending longitudinally along an axis, wherein said tube includes a wall and has an outside, an inside, and an inside length;
a plurality of grooves incorporated along the circumference of said tube into said wall on said outside of said tube;
a cooling jacket resistor incorporated into said wall from the inside, wherein said cooling jacket resistor includes a passageway that extends in the direction of said axis from a first end to a second end entirely over said inside length of said tube, wherein said passageway has a depth that inclines from said first end to said second end, said depth being smallest at said first end and being largest at said second end, and wherein said cooling jacket resistor is positioned at the lowest point of said tube when said tube is installed in said electrical motor; and
a drain port, said drain port enables draining of both condensed refrigerant and refrigerant vapor.

11. The cooling jacket of an electrical motor of claim 10, wherein said electrical motor drives a refrigerant cooled vapor cycle compressor.

12. The cooling jacket of an electrical motor of claim 10, wherein said cooling jacket including said cooling jacket resistor is a cast manufactured from a casting alloy during a casting process.

13. The cooling jacket of an electrical motor of claim 10, wherein said cooling jacket resistor further includes:
two sumps being part of said passageway and being positioned between said first end and said second end of said passageway and in close proximity to said first end; and
wherein each of said two sumps has a larger width than the remainder of said passageway and extends in the direction of said axis for a length that is smaller than said inside length of said tube.

14. The cooling jacket of an electrical motor of claim 10, wherein said tube is installed around a rotor/stator assembly of said electric motor and is in physical contact with said stator and a housing of said electric motor;
wherein said housing of said electric motor includes an inlet port for receiving a refrigerant vapor and a drain port for draining said refrigerant vapor;
wherein said cooling jacket resistor collects refrigerant vapor that has condensed on said inside of said wall of said tube and that has taken on a liquid state;
wherein said cooling jacket resistor transports said condensed refrigerant towards said second end of said passageway by gravity;
wherein said passageway of said cooling jacket resistor is in fluid connection with said drain port, and wherein said condensed refrigerant drains from said passageway through said drain port; and
wherein said passageway resists the entrance of said refrigerant vapor flowing through said cooling jacket.

15. The cooling jacket of an electrical motor of claim 14, wherein said refrigerant vapor flows within said housing and through said cooling jacket along a pressure drop and picks up heat generated during the operation of said electric motor, and wherein a portion of said refrigerant vapor is trapped within said tube when said operation of said electric motor stops, and wherein said trapped refrigerant vapor condenses on the inside of said wall of said tube.

16. A method for draining condensed refrigerant from a cooling jacket, comprising the steps of:
manufacturing a cooling jacket from a tube extending longitudinally along an axis, the tube having a plurality of grooves incorporated along the circumference of said tube into said tube on an outside surface of said tube, the cooling jacket comprising a passageway extending from a first end to a second end, wherein said passageway has a depth that inclines from said first end to said second end, wherein said passageway receives and transports a liquid, and wherein said passageway resists the entrance of a vapor, wherein said passageway is positioned inside said cooling jacket and extends for a first length in the direction of an axis, and wherein said depth is smallest at said first end and largest at said second end such that liquid present at said first end is gravitationally moved to said second end during operation of said cooling jacket, and further including a sump having a second width that is larger than said first width, wherein said sump extends in the direction of an axis for a second length that is smaller than said first length, and wherein said sump is positioned between said first end and said second end;
collecting condensed refrigerant in a cooling jacket resistor integrated into the inside of a cooling jacket of a refrigerant-vapor cooled rotor/stator assembly;
transporting said condensed refrigerant within said cooling jacket resistor towards a drain port by gravity; and
draining said condensed refrigerant along with uncondensed refrigerant vapor from said cooling jacket through said drain port.

17. The method of claim 16, further including the steps of:
cooling a rotor/stator assembly surrounded by a cooling jacket including said cooling jacket resistor with a refrigerant vapor, wherein said refrigerant vapor flows through said cooling jacket towards said drain port during operation of said rotor/stator assembly;
stopping said operation of said rotor/stator assembly; and
trapping a portion of said refrigerant vapor inside said cooling jacket where said refrigerant vapor condenses forming a condensed refrigerant having a liquid state.

18. The method of claim 16, further including the steps of:
positioning said cooling jacket resistor at the lowest point of the cooling jacket when installed; and
positioning said cooling jacket resistor within said cooling jacket to be in fluid connection with said drain port.

19. The method of claim 16, wherein the step of manufacturing the cooling jacket further includes the steps of:
manufacturing said cooling jacket including said cooling jacket resistor as a cast from a casting alloy during a casting process; and
installing said cooling jacket including said cooling jacket resistor in an electric motor or generator.

* * * * *